US012296348B2

(12) United States Patent
Thommes et al.

(10) Patent No.: US 12,296,348 B2
(45) Date of Patent: May 13, 2025

(54) ELECTROSTATIC PRECIPITATOR

(71) Applicant: TECHNISCHE UNIVERSITÄT DORTMUND, Dortmund (DE)

(72) Inventors: Markus Thommes, Düsseldorf (DE); Adrian Dobrowolski, Remscheid (DE); Helmut Wiggers, Witten (DE); Damian Pieloth, Dortmund (DE); Gerhard Schaldach, Wickede (DE); Anna Justen, Bochum (DE)

(73) Assignee: TECHNISCHE UNIVERSITÄT DORTMUND, Dortmund (DE)

( * ) Notice: Subject to any disclaimer, the term of this patent is extended or adjusted under 35 U.S.C. 154(b) by 684 days.

(21) Appl. No.: 17/602,864

(22) PCT Filed: Mar. 9, 2020

(86) PCT No.: PCT/EP2020/056218
§ 371 (c)(1),
(2) Date: Oct. 11, 2021

(87) PCT Pub. No.: WO2020/207680
PCT Pub. Date: Oct. 15, 2020

(65) Prior Publication Data
US 2022/0176384 A1 Jun. 9, 2022

(30) Foreign Application Priority Data
Apr. 9, 2019 (EP) .................................... 19168133

(51) Int. Cl.
*B03C 3/16* (2006.01)
*B03C 3/014* (2006.01)

(52) U.S. Cl.
CPC ................ *B03C 3/16* (2013.01); *B03C 3/014* (2013.01); *B03C 2201/26* (2013.01)

(58) Field of Classification Search
CPC .... B03C 3/16; B03C 3/14; B03C 3/12; B03C 3/41; B03C 3/49; B03C 2201/26
See application file for complete search history.

(56) References Cited

U.S. PATENT DOCUMENTS 3,827,217 A * 8/1974 Volsy ........................ B03C 3/36 73/28.02
4,556,481 A * 12/1985 Hepher .................. B03C 7/023 209/127.1

(Continued)

FOREIGN PATENT DOCUMENTS

DE 102011007470 A1 * 10/2012 ............... B03C 3/41
WO WO-2012140069 A1 * 10/2012 ............... B03C 3/41
WO WO-2016147127 A1 * 9/2016 ............... B03C 3/08

OTHER PUBLICATIONS

Liton Dey et al., "A Wet Electrostatic Precipitator (WESP) for Soft Nanoparticle Collection", Aerosol Science and Technology., vol. 46, No. 7, Jul. 1, 2012 (Jul. 1, 2012), pp. 750-759, XP055630248, US (11 pages).

(Continued)

*Primary Examiner* — Christopher P Jones
*Assistant Examiner* — Sonji Turner
(74) *Attorney, Agent, or Firm* — REISING ETHINGTON, P.C.

(57) ABSTRACT

An electrostatic precipitator for introducing sub-millimeter sized particles into a carrier material. The carrier material has a melting point which lies above 0° C., preferably above room temperature. The electrostatic precipitator comprises a casing having an inlet for inserting a gas flow into the casing and having an outlet for guiding a gas flow out of the casing. A channel for passing the gas flow from the inlet to the outlet is provided. A discharge electrode is provided on a first side of the channel. A collecting electrode is provided at a second side of at least a part of the channel. The electrostatic (Continued)

precipitator applies an electric field between the discharge electrode and the collecting electrode. A receiving volume is provided with a molten material as carrier material.

8 Claims, 3 Drawing Sheets

(56) References Cited

U.S. PATENT DOCUMENTS

| | | | | | |
|---|---|---|---|---|---|
| 5,476,539 | A * | 12/1995 | Suzuki | B03C 3/60 96/99 |
| 5,529,762 | A * | 6/1996 | Alexander | B01D 53/08 95/68 |
| 5,603,910 | A * | 2/1997 | Alexander | C03B 5/237 95/68 |
| 7,534,288 | B2 * | 5/2009 | Bromberg | B03C 3/06 96/60 |
| 8,337,600 | B2 * | 12/2012 | Paur | B03C 3/41 96/96 |
| 8,779,382 | B1 * | 7/2014 | Tsai | H01T 23/00 250/306 |
| 9,259,742 | B2 * | 2/2016 | Roux | B03C 3/12 |
| 10,799,883 | B2 * | 10/2020 | Pourprix | G01N 1/2202 |
| 10,933,430 | B2 * | 3/2021 | Wolf | B03C 3/88 |
| 2004/0226449 | A1 * | 11/2004 | Heckel | B03C 3/49 96/88 |

OTHER PUBLICATIONS

C. Anderlohr et al., "Direct Transfer of Gas-Borne Nanoparticles into Liquid Suspensions by Means of a Wet Electrostatic Precipitator", Aerosol Science and Technology, vol. 49, No. 12, Dec. 2, 2015 (Dec. 2, 2015), pp. 1281-1290, XP055629763, US (11 pages).

Adrian Dobrowolski et al., "Preparation of spray dried submicron particles: Part B—Particle recovery by electrostatic precipitation", International Journal of Pharmaceutics, vol. 548, No. 1, Sep. 1, 2018, pp. 237-243, XP055630315, NL (7 pages).

International Search Report for International Application No. PCT/EP2020/056218 dated Jun. 9, 2020 (4 pages).

International Preliminary Report on Patentability for International Application No. PCT/EP2020/056218 dated Oct. 12, 2021 (13 pages).

* cited by examiner

ELECTROSTATIC PRECIPITATOR

The present disclosure generally relates to an electrostatic precipitator. The present disclosure further relates to a process for introducing sub-millimeter sized particles into a carrier material as well as to a use of an electrostatic precipitator for producing at least one of a pharmaceutically active composition, a food item or a crop protection item. The present disclosure further relates to an arrangement of an electrostatic precipitator and a system for forming sub-millimeter sized particles from a particle compound.

There are some applications which require introducing particles, such as sub-millimeter sized particles, into a matrix. For example, it is known to use pharmaceutically active compounds in a carrier matrix. Further examples comprise food items or crop protection items.

Sub-millimeter sized particles can be manufactured by spray drying and must subsequently be separated from the gas stream. Separation of these small particles takes place with the aid of fibre and membrane filters or electrostatic precipitators. Electrostatic precipitators are more suitable for sub-millimeter sized particles than fiber filters because the valuable product is not trapped in the depths of the filter material. A disadvantage of an electrostatic precipitator, in certain instances, is the possible formation of agglomerates of the sub-millimeter sized particles on the precipitation electrode of the electrostatic precipitator. These agglomerates can harm the improvement in bioavailability due to the decreasing specific surface area and simultaneously poorer wettability.

Anderlohr, C., Schaber, K., 2015, Direct Transfer of Gas-Borne Nanoparticles into Liquid Suspensions by Means of a Wet Electrostatic Precipitator, Aerosol Science and Technology 49, 1281-1290, describes the transfer of flame-synthesized aerosols of silica nanoparticles into aqueous suspensions. It is described to use a wet electrostatic precipitator.

Kudryashova, O., Vorozhtsov, S., Stepkina, M., Khrustalev, A., 2017, Introduction of Electrostatically Charged Particles into Metal Melts, Jom 69, 2524-2528, generally describes the introduction of submicron or nanosized particles into metal melts. In more detail, strengthening particles are introduced into molten metals by using ultrasonic cavitation. The particles are electrostatically charged in order to improve wettability.

The efforts of the prior art, however, still give room for improvements.

SUMMARY

Based on the above, one object according to an embodiment of the present disclosure is to overcome at least one disadvantage of the prior art at least in part. In particular, it is an object according to an embodiment of the present disclosure to provide a solution for introducing sub-millimeter sized particles into a carrier material in a gentle and effective manner, wherein the carrier material is a solid at 0° C., preferably at room temperature.

Advantageous embodiments are given in the dependent claims, in the further description as well as in the figures, wherein the described embodiments can, alone or in any combination of the respective embodiments, provide a feature of the present invention unless not clearly excluded. Further features and advantages as described in respective embodiments can be transferred to further embodiments.

The present disclosure, per an embodiment, provides an electrostatic precipitator for introducing sub-millimeter sized particles into a carrier material, wherein the carrier material has a melting point which lies above 0° C., preferably above room temperature, wherein the electrostatic precipitator comprises a casing having an inlet for inserting a gas flow into the casing and having an outlet for guiding a gas flow out of the casing, wherein a channel for passing the gas flow from the inlet to the outlet is provided between the inlet and the outlet, wherein a discharge electrode is provided on a first side of the channel and wherein a collecting electrode is provided at a second side of at least a part of the channel, the second side being located opposite to the first side such, that the electrostatic precipitator is adapted for applying an electric field between the discharge electrode and the collecting electrode, wherein adjacent to the collecting electrode and between the collecting electrode and at least a part of the channel, a receiving volume is provided, wherein located in the receiving volume is a molten carrier material, wherein the carrier material has a melting point which lies above 0° C., preferably above room temperature.

Such a precipitator shows advantages, per certain embodiments, over solutions of the prior art. In more detail, such a precipitator, per an embodiment, solves the object to provide an approach for introducing sub-millimeter sized particles into a carrier material in a gentle and effective manner, wherein the carrier material is a solid at 0° C., preferably at room temperature. Thus, the electrostatic precipitator is designed for forming a solid dispersion.

The present disclosure, per an embodiment, thus relates to an electrostatic precipitator. Generally, electrostatic precipitators are known in the art. Electrostatic precipitators generally collect particles by applying an electrical field, thereby electrically charging the particles. The electrically charged particles may then be collected at a collecting electrode due to electrostatic attraction by the collecting electrode. The general principle of such precipitators is known in the art.

However, according to the prior art, electrostatic precipitators were mainly used for gas cleaning, such as for dust separators in power plant technology or to clean the air for clean room applications. Also known are wet electrostatic precipitators, which are usually operated with water and are thus adapted for directly cleaning the collecting electrode.

Sub-millimeter sized particles in the sense of the present disclosure, per an embodiment, are particularly particles which have a size of less than 1 mm, such as less than 10 μm. For example, it may be provided that the sub-millimeter sized particles are submicron particles. With regard to such sub-millimeter sized particles which are of increased interest for a plurality of applications in which sub-millimeter sized particles should be introduced into a carrier material, such precipitators according to the prior art are of decreased importance. This is mainly due to the fact that such particles are often collected by means of fibre filters or membrane filters instead of electrostatic precipitators. This however has the disadvantage that further problems with regard to releasing the particles from the filter may arise. In case electrostatic precipitators are used for collecting sub-millimeter sized particles, the problem of releasing the collected particles is no issue. However, according to the prior art, using electrostatic precipitators was problematic as often the particles agglomerated at the collecting electrode. Such agglomerates, however, can have detrimental effects for the respective application. In particular, the advantage of sub-millimeter sized particles is at least in part reduced or totally suspended.

In order to overcome such drawbacks known from the prior art, the electrostatic precipitator is formed as a melt electrostatic precipitator and allows embedding sub-millimeter sized particles of different kinds in a carrier material, in an effective and gentle manner.

In more detail, the electrostatic precipitator as described comprises a casing having an inlet for inserting a gas flow into the casing and having an outlet for guiding a gas flow out of the casing, wherein a channel for passing a gas flow from the inlet to the outlet is provided between the inlet and the outlet. The gas stream which may be inserted into the housing through the inlet and which may leave the housing through the outlet may be adapted to initially comprise sub-millimeter sized particles. Therefore, the inlet is provided for guiding the sub-millimeter sized particles into the electrostatic precipitator and the outlet is provided for guiding the gas stream which is depleted with regard to the sub-millimeter sized particles out of the electrostatic precipitator. The inlet is thus connected to a source of sub-millimeter sized particles as will be described in greater detail below.

Between the inlet and the outlet, a channel is provided through which the gas stream flows through the electrostatic precipitator. Accordingly, in the course of the channel, the electrostatic precipitator is designed, per an embodiment, to remove the sub-millimeter sized particles from the gas stream, or at least to deplete the gas stream with regard to the sub-millimeter sized particles and to collect the sub-millimeter sized particles.

In order to remove the sub-millimeter sized particles from the gas stream and to collect the sub-millimeter sized particles, it is provided that the electrostatic precipitator comprises a discharge electrode on a first side of the channel and a collecting electrode at a second side of at least a part of the channel, the second side being located opposite to the first side such, that the electrostatic precipitator is adapted for applying an electric field between the discharge electrode and the collecting electrode. For example, the discharge electrode and the collecting electrode may each limit the extension of the channel in two opposite directions completely, which means that the channel does not have any extension further than these opposite directions, one of these directions carrying the discharge electrode and the opposite direction carrying the collecting electrode. As a further alternative, the discharge electrode may proceed through the channel and the collecting electrode may limit the channel at its outer positions. For example, the discharge electrode may form the axis of the channel and the collecting electrode may form at least a part of the outer wall of the channel.

It is thus allowed that the gas stream flows through an electrostatic field which in turn acts on the sub-millimeter sized particles. This in turn allows that the sub-millimeter sized particles are attracted by the collecting electrode and may thus be collected in the area of the collecting electrode.

With this regard, and according to certain embodiments, there may be two main effects which may lead to deflecting the particles in order to collect them in the carrier material like described below.

The first effect may comprise that the particles are electrically charged by the influence of the electrostatic field. Thus, an attraction of the collecting electrode may act on the charged particles because of which the particles may be deflected and collected. Electrically charging the particles may be realized, for example, by using a corona discharge by using a two-stage precipitator like described above and below, but may also be realized in a one state precipitator.

The further effect may comprise the occurrence of an electric wind, also called ion wind. This effect may occur e.g. when using a corona discharge between the electrodes and may also act on the particles by deflecting them to the collecting electrode.

With this regard, it is subject of the present disclosure, per an embodiment, that collecting the particles is based on electrically charging the particles, by the occurrence of an ion wind or both of these effects.

In order to achieve this, an electric potential may be formed between the collecting electrode and the discharge electrode in order to form an appropriate electric field. The electric field may be large enough to allow a corona discharge to appear between the discharge electrode and the collecting electrode.

In order to collect the sub-millimeter sized particles, it is provided that adjacent to the collecting electrode and between the collecting electrode and at least a part of the channel, a receiving volume is provided for receiving a molten carrier material. With this regard, it is provided that the carrier material has a melting point which lies at or higher than 0° C. It may be preferred, that the melting point of the carrier materiel lies at or higher than room temperature (22° C.) or even higher, such as at or higher than 40° C., such as at or higher than 50° C., particularly at or higher than 75° C.

Further, the receiving volume is positioned adjacent to the collecting electrode and thus in an area at which the sub-millimeter sized particles are deflected to when the gas stream passes the channel. In more detail, the receiving volume is positioned between the collecting electrode and at least a part of the channel, which per certain implementations is a very efficient position for receiving deflected sub-millimeter sized particles.

Thus, due to the fact that the receiving volume is positioned like defined above, it is possible that the sub-millimeter sized particles are guided into the volume by the one or both of the effects as described before. Therefore, in case a molten carrier material is provided inside the volume, the sub-millimeter sized particles may be received by the melt and may be finely dispersed in the melt. Additionally to the fine dispersion of the sub-millimeter sized particles in the melt, the particles are provided in the melt at least in part, preferably completely per certain embodiments, in an isolated form as single particles and thus without an agglomeration of the particles to appear.

The electrostatic precipitator is thus capable of and designed for embedding individual and preferably non-agglomerated sub-millimeter sized particles in a carrier matrix. In order to achieve this, per certain embodiments, the electrostatic precipitator is capable of melting the carrier material and/or of keeping the carrier material as matrix in the molten state in order to absorb the sub-millimeter sized particles to form a solid dispersion. Preferably but not limited thereto, this allows providing sub-millimeter sized particles to be present in the matrix in an isolated and thus non-agglomerated form. In other words, the electrostatic precipitator as described here is designed to convert sub-millimeter sized particles which are initially present in the gas stream which enters the electrostatic precipitator into the melt and form a solid dispersion with the melt after solidification of the carrier material. However, it is not strictly excluded from the present disclosure, per an embodiment, that some agglomerates of the sub-millimeter sized particles are present in the carrier material.

Such an arrangement is generally advantageous, per certain embodiments, for every application in which sub-millimeter sized particles should be finely divided into a melt in a non-agglomerated form.

In particular, such a precipitator particularly provides an effective and gentle way to introduce sub-millimeter sized particles into a carrier material, wherein sub-millimeter sized particles may be introduced into a carrier material which is solid at room temperature, for example, or in other words, which has a melting point which lies at or higher than 0° C. such as at or higher than room temperature. This is often required for a plurality of applications but could not be reached by using conventional precipitators as known in the prior art.

It is thus the idea of the inventors, according to certain embodiments of the disclosure, to provide a molten carrier material in the receiving volume and thus to significantly enlarge the application area. Especially, it is effectively and gently possible to introduce sub-millimeter sized particles into a carrier material being solid at room temperature. Such applications were not possible by using respective precipitators according to the prior art.

Therefore, the precipitator as described here differs from known liquid precipitators from the prior art and has advantages as well as applications areas which could not be reached by using known precipitators.

Correspondingly to the above, provided is an arrangement of an electrostatic precipitator for introducing sub-millimeter sized particles into a carrier material and a carrier material, wherein the electrostatic precipitator comprises a casing having an inlet for inserting a gas flow into the casing and having an outlet for guiding a gas flow out of the casing, wherein a channel for passing the gas flow from the inlet to the outlet is provided between the inlet and the outlet, wherein a discharge electrode is provided on a first side of the channel and wherein a collecting electrode is provided at a second side of at least a part of the channel, the second side being located opposite to the first side such, that the electrostatic precipitator is adapted for applying an electric field between the discharge electrode and the collecting electrode, wherein adjacent to the collecting electrode and between the collecting electrode and at least a part of the channel, a receiving volume is provided, and wherein the carrier material is located in the receiving volume in a molten state, wherein the carrier material has a melting point which lies above 0° C., preferably above room temperature.

It may be preferred, per an embodiment, that a heater is provided for heating the carrier material positioned in the receiving volume. The provision of the heater allows that the material which is present in the volume is left in a molten state and thus it is ensured that a melt is present in the receiving volume. It is thus preferred, per an embodiment, that the heater is adapted to the specific application so that the heater may provide sufficient energy in order to melt the material in the receiving volume and/or to hold the material in the receiving volume over its melting temperature. Correspondingly, the exact position and the specific kind of heater may be chosen in dependence of the specific application and thus in particular in dependence of the material used for being placed in the receiving volume.

However, even though it might be preferred, that a heater like described before is present, a heater may also be omitted. In that case, the molten carrier material may be introduced into the receiving volume and may leave the receiving volume when it is loaded with sub-millimeter sized particles before it solidifies. This might be realized, for example, in case the carrier material flows through the receiving volume with a defined speed so that the time it stays in the receiving volume is sufficiently low so that solidification is avoided. Further, it may be provided that the gas stream which is introduced into the precipitator has a temperature which lies above room temperature so that the carrier material may be heated by the gas stream. Therefore, the general conditions used for collecting the particles in the carrier material are adapted such, that the particles may be collected in a molten carrier material and may preferably be introduced in and/or extracted from the precipitator.

Like indicated above, it is preferred, per certain embodiments, that the gas inlet is in fluid communication with a device for producing sub-millimeter sized particles. With this regard, it may be provided that formed sub-millimeter sized particles can be inserted directly into the inlet and can thus enter the electrostatic precipitator in a defined manner and without the problem of degradation.

Apart from the high stability of such processes with regard to the sub-millimeter sized particles, this embodiment is effective and may work highly synergistic.

With regard to the device for producing sub-millimeter sized particles, this device is generally not restricted in the sense of the present disclosure. However, it may be preferred that the device for producing sub-millimeter sized particles is a spray drying device. Especially in this embodiment but not restricted thereto, it may be provided that the sub-millimeter sized particles are submicron particles.

With the help of spray drying, for example, sub-millimeter sized particles such as particles of a pharmaceutically active compound may be generated in a very defined and efficient manner so that the particles may be introduced directly into the melt as no further process steps are required. For example, no further drying steps are required as the sub-millimeter sized particles are formed as dry particles and they may thus be directly inserted into the electrostatic precipitator in a gas stream without prior drying steps.

Further, spray drying allows sub-millimeter sized particles, such as pharmaceutically active compounds, to dry at moderate temperatures. This allows even sensitive particles to be formed in the sub-millimeter sized range. This is an advantage, per an embodiment, for example over melt milling in which respective material is milled down to the sub-millimeter sized range and are simultaneously embedded in a melt matrix. Such melt milling processes are disadvantageous for temperature sensitive substances, as temperature peaks can lead to damage to the pharmaceutically active compound during shearing.

Therefore, in combination with spray drying, the present electrostatic precipitator per certain embodiments is advantageous as it is not required to use high temperatures for producing sub-millimeter sized particles as well as for collecting the sub-millimeter sized particles and further for embedding them into a matrix. With regard to the temperature to be applied, it is only required to apply a temperature which is sufficient for melting the carrier material which is provided in the receiving volume and/or to maintain it as melt. Thus, a very gentle process may be allowed in order to produce sub-millimeter sized particles and to embed them in a matrix which as well is beneficial for pharmaceutical applications as a non-limiting example.

It may further be provided that the electrostatic precipitator is a one-stage precipitator, wherein the one stage precipitator comprises a first stage having a first chamber which is adapted for applying an electric field acting on sub-millimeter sized particles being present in the gas stream and wherein the first chamber is further adapted for collecting the sub-millimeter sized particles at the receiving volume, and wherein the first chamber is further in fluid communication with the channel. A one-stage precipitator is thus such a precipitator, in which the same electrical field is used for charging the particles and/or providing a ion wind as well as for collecting the particles. According to this embodiment, an especially simple arrangement may be realized, as only one two electrodes, i.e. the discharge electrode and the collecting electrode, are required. Further, such an electrostatic precipitator may be especially small so that an application even in limited building space is possible. With regard to the electric field, this may applied by using a corona discharge.

It should be noted that a corona discharge in the sense of the present disclosure shall comprise a positive corona or a negative corona without leaving the disclosure.

Alternatively, it may be provided that the electrostatic precipitator is a two-stage precipitator, wherein the two-stage precipitator comprises a first stage which is adapted for applying an electric field acting on the sub-millimeter sized particles for electrically charging the sub-millimeter sized particles being present in the gas stream and wherein the two-stage precipitator comprises a second stage with a second chamber, wherein the second chamber is adapted for collecting the electrically charged sub-millimeter sized particles at the receiving volume, and wherein the first chamber and the second chamber are in fluid communication with the channel.

With regard to the first stage, it may be provided the first stage comprises at least one of a ion blower and a first chamber having an arrangement of electrodes for forming an electric field.

With regard to a two-stage precipitator, the second stage is positioned downstream of the first stage with regard to the flow direction of the gas stream. According to this embodiment, thus, a different electrostatic field, i.e. at different positions, is used for electrically charging the particles and for collecting the particles. Therefore, the first chamber may be tailored for electrically charging the particles and the second chamber may be tailored for collecting the particles at the collecting electrode and thus adjacent to the collecting electrode.

This may for example allow the advantage, per an embodiment, according to which the particles may be electrically charged in the first chamber to a maximal possible electric charge, and the electrically charged particles may then be precipitated in the second chamber. Even in case a corona discharge is used for electrically charging the particles in the first chamber, collecting the particles may be realized free of corona discharge in the second chamber. The electric field in the second chamber can be higher than in the first chamber due to the lack of sharp discharge points. A higher electric field allows an increase of the collection efficiency of the sub-millimeter sized particles. Therefore, according to this embodiment, the electrostatic precipitator may allow an effective collection of the particles.

It may further be provided that the electrostatic precipitator per an embodiment comprises a loading inlet for loading the receiving volume with carrier material and that the electrostatic precipitator comprises an unloading outlet for unloading carrier material from the receiving volume. According to this embodiment, it may be especially easy to load and to unload the carrier material, wherein for example the carrier without sub-millimeter sized particles may be loaded into the receiving volume and the carrier material having the sub-millimeter sized particles may be unloaded rom the receiving volume. Further, continuous processes are allowed so that processes performed with an electrostatic precipitator may be especially effective.

It may further be provided that the casing is formed at least in part from an electrically insulating material. This may for example improve the usability of the electrostatic precipitator. For example, if the carrier material is electrically conductive it may be prevented that electrical charges are transferred to the casing of the precipitator. For example, the housing may be formed at least in part from a ceramic material.

It may further be provided that the casing is formed at least in part from an electrically conductive material, wherein the collecting electrode is formed by the electrically conductive material of the housing. According to this embodiment, the collecting electrode may be large so that the collecting step of the particles may be carried out especially effective. Apart from that, no additional electrode has to be provided so that the arrangement of an electrostatic precipitator according to this embodiment may be easy and with reduced periphery, which may save costs and effort when building the electrostatic precipitator. Examples for respective materials which might form the electrode and may thus form the casing, or housing, respectively, may comprise metals, such as copper or aluminum. It may, however, be preferred per certain embodiments if the material of the casing is formed from a material having a high thermal conductivity in case the material is positioned between a heating element and the receiving volume. On the other side, in case the receiving volume should be thermally insulating, the respective material limiting the receiving volume may be a material having a low thermal conductivity.

It may further be provided that the heater is positioned at a side of the collecting electrode being opposite to the channel. Especially at an example according to this embodiment but not strictly limited thereto, it may be provided that a uniform heating may be realized which in turn reduces blind spots. This may generally be provided due to the large space available at this position. However, generally, the position of the heating element may be chosen in a free manner.

With regard to further technical features and advantages of the electrostatic precipitator, it is referred to the description of the method, the arrangement, the use, the figures and the example and vice versa.

Further described is an arrangement of an electrostatic precipitator and a system for forming sub-millimeter sized particles from a particle compound, wherein the electrostatic precipitator and the system for forming sub-millimeter sized particles are arranged for guiding sub-millimeter sized particles from the system for forming sub-millimeter sized particles into the electrostatic precipitator, wherein the electrostatic precipitator is arranged like described above, and wherein the system for forming sub-millimeter sized particles comprises an aerosol generator, the aerosol generator comprising a nebulizing chamber with a first inlet, a second inlet and an outlet, wherein a tank for receiving particle compound solution is connected to the first inlet for introducing a solution of particle compound into the nebulizing chamber and wherein a tank for receiving carrier gas is connected to the second inlet for introducing a carrier gas stream into the nebulizing chamber, wherein a nebulizer is provided in the nebulizing chamber to form an aerosol out of the particle compound solution such, that the carrier gas stream guides the aerosol out of the nebulizing chamber through the outlet, wherein the outlet is connected to the electrostatic precipitator through a dryer for forming dry sub-millimeter sized particles by evaporating the solvent of the aerosol.

Especially such an arrangement may provide a solution for forming sub-millimeter sized particles such, that they may be inserted into the electrostatic precipitator and may be handled to form a solid dispersion in a defined an controllable manner. Further, the particles may be handled very safely. This may be important as nanoparticular aerosols pose a hazard to the environment by severe reactions and a high pulmonary mobility. It is thus of high interest to handle them safely. According to this embodiment sub-millimeter sized particles, such as submicron drug particles, are produced with ultrasonic atomization technique in a specially designed aerosol generator and precipitated in a melt electrostatic precipitator.

The system for forming sub-millimeter sized particles comprises an aerosol generator, wherein the aerosol generator comprises a nebulizing chamber as central element. It comprises a first inlet which is connected to a tank for receiving particle compound solution. This first inlet may be positioned such, that the solution is guided to a nebulizer which forms an aerosol out of the particle compound.

The nebulizer may comprise a piezo element, for example, which emits ultrasound waves, such as in a frequency of more than 2 MHz, such as 3 MHz. This is in contrast to the prior art in which often ultrasonic atomization was used for the generation of small, uniform droplets in other spray drying devices with ultrasonic frequencies of up to 140 kHz.

This embodiment allows in a very efficient manner by using a high frequency to produce an aerosol which has very small droplets and which thus may form very small particles in the further procedure. This allows providing sub-millimeter sized particles to be present in the matrix of the carrier material in an isolated and thus non-agglomerated form in a very effective manner.

Further, connected to the second inlet is a tank for introducing a carrier gas stream into the nebulizing chamber. The second inlet, such as the first inlet, may for example be positioned in a tangential manner, and is further positioned such, that the carrier gas stream guides the formed aerosol out of the nebulizing chamber through the outlet.

Downstream of the outlet, the aerosol flows through a dryer in which the solvent of the aerosol is evaporated so that dry sub-millimeter sized particles are formed. Further downstream, the particles enter the inlet of the electrostatic precipitator.

This embodiment allows by just adapting the flow speed of the carrier gas to adapt the formation of the particles to the requirements of the precipitator and further to take influence in a very defined manner to the solid dispersion which is formed. Therefore, the amount of particles, for example, which are loaded into the carrier material may be controlled in a reproducible and defined manner so that the solid dispersion which is formed can be tailored to the desired needs.

With the new developed aerosol generator the production of dry nanoparticles in a size range below 200 nm and a high mass flow range was achieved. It is a promising tool to generate submicron particles in laboratory scale and also has potential for scale-up trials.

Consequently, a combination of the described aerosol generator together with the precipitator may give synergistic effects which are not achievable according to the prior art. The combination of the aerosol generator and the electrostatic precipitator leads to solid crystalline suspensions as solid dispersions, which are expected to improve the dissolution behaviour of the drug and stability issues of the solid dispersion.

With regard to further technical features and advantages of the arrangement, it is referred to the description of the method, the electrostatic precipitator, the use, the figures and the example and vice versa.

Further described is a method for placing sub-millimeter sized particles in a carrier material, wherein the carrier material has a melting point which lies above 0° C., preferably above room temperature, wherein the method comprises the following steps:

a) Providing an electrostatic precipitator like described before;
b) Providing carrier material in the receiving volume, wherein the carrier material is in the form of a melt;
c) Guiding the sub-millimeter sized particles in a gas stream into the inlet and into the channel;
d) Applying an electrostatic field between the discharge electrode and the collecting electrode such, that the sub-millimeter sized particles are guided into the molten carrier material; and
e) Removing the carrier material with embedded sub-millimeter sized particles from the receiving volume.

Such a method allows, after solidification of the carrier material, forming a solid dispersion and thus a solid dispersions of finely distributed sub-millimeter sized particles in the carrier material. In more detail, the sub-millimeter sized particles are embedded in the carrier material in isolated and thus preferably non-agglomerated form. This allows improved properties in a wide filed of applications.

In order to achieve this and according to method step a), an electrostatic precipitator is provided like described before. With regard to the electrostatic precipitator it is thus referred to the further description.

According to method step b), the method comprises the step of providing a carrier material for carrying sub-millimeter sized particles in the receiving volume in the form of a melt. The carrier material may thus be loaded into the receiving volume already in the form of a melt and may be maintained as melt in the receiving volume, or it may be loaded in the form of a solid and may be molten in the receiving volume. For example, the carrier may be loaded into the receiving volume via a respective inlet.

The kind of carrier material is not generally limited as long as it has a melting point of more than 0° C. For example, the carrier material may comprise a sugar alcohol like it is generally known in the art for pharmaceutically active compositions, for example. Such a carrier has the advantage, per certain embodiments, of a low melting point which allows a gentle method without harsh conditions for the sub-millimeter sized particles. For this purpose, it is generally preferred per an embodiment that the carrier material has a melting point which is lower compared to a melting point of the sub-millimeter sized particles and which is lower compared to a degradation temperature of the sub-millimeter sized particles.

Generally, a carrier material according to the present disclosure, per an embodiment, is a vehicle, which is mainly suited for receiving the sub-millimeter sized particles and which is used for carrying the latter and thus acts as a matrix for using the sub-millimeter sized material of the sub-millimeter sized particles.

According to method step c), the method comprises the step of guiding sub-millimeter sized particles in a gas stream into the inlet and into the channel. This may be realized by providing a device for forming respective sub-millimeter sized particles into the inlet. As an example, a spray drying device may be provided, which may be in a fluid connection to an inlet of the precipitator.

The carrier material, such as the sugar alcohol, is molten and is thus ready to receive such as to adsorb the sub-millimeter sized particles and thus to produce a solid dispersion with the particles after solidification.

Further according to method step d), the method comprises the step of applying an electrostatic field between the discharge electrode and the collecting electrode such, that the sub-millimeter sized particles are guided into the molten carrier material. This may be realized by applying an electrostatic field by using a discharge electrode and a collecting electrode, for example, and by positioning the melt in the receiving volume adjacent to the collecting electrode like described above. This step allows to finely divide the sub-millimeter sized particles in the melt without forming agglomerates or with a significantly reduced amount of agglomerates and thus particularly in an isolated form.

Again, this step may be based on the occurrence of ionic winds or on charging the particles.

Further and according to method step e) the method comprises the step of removing the carrier material as melt with embedded sub-millimeter sized particles from the receiving volume. This may be realized, for example, by means of an unloading outlet. Preferably, the carrier material may be removed in molten form and may be cooled down afterwards.

It may further be provided that the applied electric field for electrically charging the sub-millimeter sized particles is formed by using a corona discharge. This embodiment allows effectively electrically charging the sub-millimeter sized particles and further collecting the charged particles in a very effective manner. In other words, this embodiment allows a very effective process of forming pharmaceutically active compositions. With this regard, either a positive or a negative corona may be used.

It may further be provided that the sub-millimeter sized particles have a size in the range of ≥1 nm to ≤10 μm, such as in the range of 100 nm to ≤1000 nm. This embodiment allows a very broad application range and further improved properties for a wide area of applications. As exemplary embodiments, pharmaceutically active compositions, food items and crop protection items are referred to. Apart from that, it is possible to form such particles by known processes, such as by spray drying, which allows an easy implementation of the present disclosure without the requirement for developing new processes for forming the sub-millimeter sized particles.

It may further be provided that the temperature of the melt in the receiving volume is controlled by a control loop. With this regard, a temperature sensor may be provided which senses the temperature of the melt and sends the data to a control unit. Based on the sensed temperature, the control unit may trigger a suitable process so that the temperature of the melt is always above the melt temperature of the carrier material but preferably below the melting point or the degradation point of the sub-millimeter sized particles. This embodiment allows an especially stable process which ensures a gentle treatment of the sub-millimeter sized particles. The process which may be triggered may comprise, inter alia, at least one of controlling a heating device which acts on the receiving volume, controlling a heating device which acts on the carrier material before in enters the receiving volume and controlling a heating device which acts on the gas stream.

With regard to further technical features and advantages of the method, it is referred to the description of the electrostatic precipitator, the use, the figures and the example and vice versa.

Further described is a use of an electrostatic precipitator for forming at least one of pharmaceutically active composition, a food item and a crop protection item. The electrostatic precipitator is configured like described in the further description.

Especially when using the precipitator as described above, it may be important to provide a carrier material with finely distributed sub-millimeter sized particles.

Poorly water soluble active pharmaceutical ingredients, also called pharmaceutically active compounds, are creating a challenge for bioavailability nowadays. Approximately 90% of the active ingredient molecules under development are poorly water soluble. The miniaturization of active ingredient particles by milling or spray drying can be correlated with an increase in bioavailability. The enlargement of the particle surface can lead to an increased mass transfer. At the same time, the saturation concentration can be increased by the use of sub-millimeter sized particles or even submicron particles.

In recent days, thus, sub-millimeter sized particles are in focus to increase the bioavailability of poorly water-soluble drugs and are used in a pharmaceutically acceptable carrier, or in other words in an excipient carrier matrix, thereby allowing a high bioavailability of the pharmaceutically active compounds. In other words, by providing isolated sub-millimeter sized particles of such pharmaceutically active compounds in a carrier matrix, such as in a pharmaceutically acceptable carrier, solubility can be improved and efficiency can be increased. In other words, the bioavailability may be enhanced.

Especially, by finely dividing isolated and thus non-agglomerated sub-millimeter sized particles into a melt, i.e. into a carrier material may provide advantages. This may be due to the fact that forming agglomerates, which may be prevented or at least reduced by a described precipitator, can harm the improvement in bioavailability due to the decreasing specific surface area.

The present disclosure, per an embodiment, thus allows administering a reduced amount of pharmaceutically active compounds by achieving a high efficiency. In turn, this allows preventing high doses of pharmaceutically active compounds and thus reducing side effects. Apart from that the dissolution rate can be increased by embedding the sub-millimeter sized particles in a melt by using an electrostatic precipitator or a method like described in the further description. Thus, an accelerated pharmaceutical effect may be reached.

Therefore, the disadvantage of poor water solubility and poor bioactivity may be overcome efficiently.

However, the before-described advantages are not only valid for pharmaceutically active compositions but the same effects may be achieved for further applications. In fact, providing good water solubility and generally a high bioavailability may, for example, also be advantageous in the field of food items and crop protection items.

With regard to food items, for example, it may be advantageous to introduce food supplements into a carrier matrix for food usage. Examples for such food supplements comprise in a non-limiting manner manganese and selenium.

Further and with regard to crop protection items, the active ingredients may also be introduced into a carrier matrix like described above and may thus have an improved activity and availability, allowing the respective compositions having an improved applicability.

Given the above, provided is the use of an electrostatic precipitator for forming at least one of pharmaceutically active composition, a food item and a crop protection item.

The electrostatic precipitator is configured like described in the further description and the pharmaceutically active composition, a food item and a crop protection item is formed as a solid dispersion.

However, further applications such as the entrapment of hazardous nanomaterial in a harmless matrix during the process of gas cleaning, which can be safely removed afterwards, is not excluded from the present disclosure.

With regard to further technical features and advantages of the use, it is referred to the description of the electrostatic precipitator, the method, the figures and the example and vice versa.

BRIEF DESCRIPTION OF THE FIGURES

These and other aspects of the invention will be apparent from and elucidated with reference to the figures and examples described hereinafter, wherein even individual features disclosed in the figures and the examples and in the disclosure as a whole can constitute an aspect of the present invention alone or in combination, wherein additionally, features of different embodiments can be carried over from one embodiment to another embodiment without leaving the scope of the present invention.

In the drawings.

DETAILED DESCRIPTION

Figure 1:
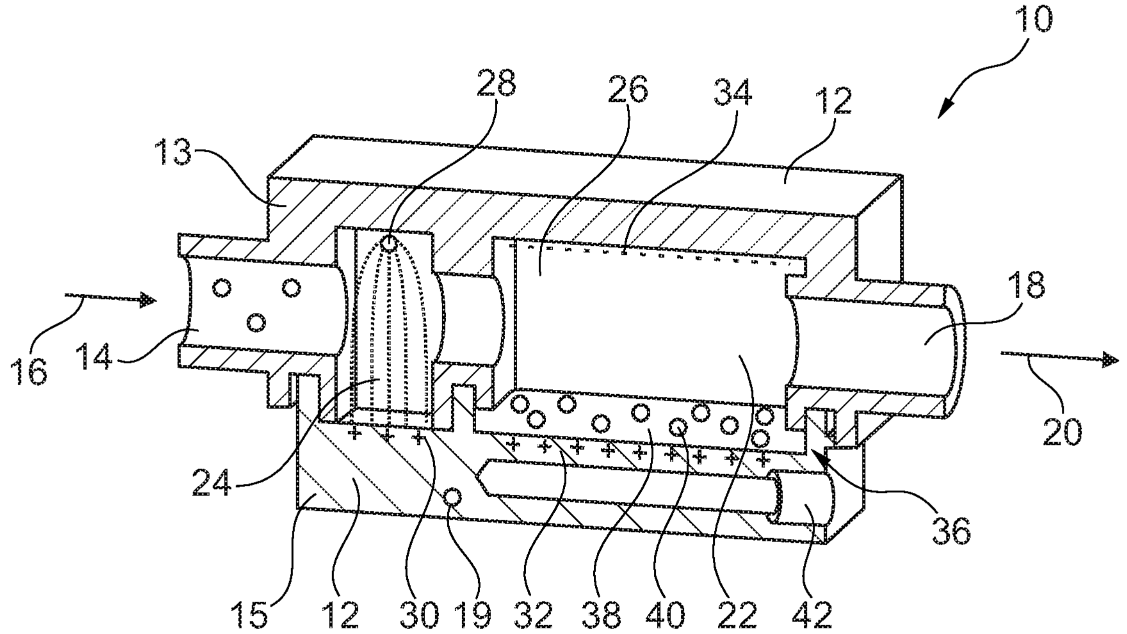
FIG. 1 shows an exemplary view of an electrostatic precipitator according to an embodiment of the disclosure.

FIG. 1 shows an electrostatic precipitator 10, which is designed as a melt electrostatic precipitator like described in detail below. Such an electrostatic precipitator 10 may be used to convert sub-millimeter sized particles 40 e.g. of pharmaceutically active compounds into a solid dispersion in order to increase the bioavailability of active pharmaceutical ingredients, for example. Further examples comprise food items or crop items which comprise a carrier with sub-millimeter sized particles 40.

In order to achieve this, the electrostatic precipitator 10 is arranged as follows.

The electrostatic precipitator 10 comprises a casing 12 having an inlet 14 for inserting a gas flow into the casing 12, which is visualized by the arrow 16. Further, the electrostatic precipitator 10 comprises an outlet 18 for guiding a gas flow out of the casing 12, which is visualized by the arrow 20. Further, a channel 22 is provided for passing the gas flow from the inlet 14 to the outlet 18.

FIG. 1 further shows that the electrostatic precipitator 10 is a two-stage precipitator, wherein the two-stage precipitator comprises a first stage with a first chamber 24 which is adapted for electrically charging particles 40 being present in the gas stream and wherein the two-stage precipitator further comprises a second chamber 26 which is adapted for collecting the electrically charged particles 40. Both of the first chamber 24 and the second chamber 26 are in fluid communication with the channel 22. In other words, the channel 22 passes through the first chamber 24 as well as through the second chamber 26, wherein the second chamber 26 is located downstream to the first chamber 24 with regard to the flow direction of the gas stream.

For producing an electrostatic field in order to electrically charge the particles 40, a discharge electrode 28 and a counter electrode 30 are provided at the first chamber 24. The counter electrode 30 is part of the casing 12 and also acts as collecting electrode 32 at the second chamber 26 and also at the first chamber 24 like described below. The counter electrode 30 and the collecting electrode 32, respectively, may be on ground potential and may be formed by the stainless steel metal block which forms the casing 12. Thus a corona discharge may be realized between the discharge electrode 28 and the counter electrode 30 in the first chamber 24 by applying voltage to the discharge electrode 28.

Particles 40 located between the discharge electrode 28 and the counter electrode 30 and thus in the channel 22 in the first chamber 24, or first stage, respectively, are charged and move along the electric field to the collecting electrode 32 in the second chamber 26 or second stage, respectively. No further charging is required in the second stage. Instead, the particles 40 move in an electric field generated by two electrodes of different potential. However a field electrode 34 may be provided opposite to the collecting electrode 32 with regard to the channel in the second chamber in order to create an electric field also no corona discharge is required in the second chamber 26.

It is further provided that adjacent to the collecting electrode 32 and between the collecting electrode 32 and at least a part of the channel 22, a receiving volume 36 is provided for receiving a molten material 38, i.e. a carrier material. This allows thus that by influence of the electric field, the sub-millimeter sized particles 40 are guided into the molten material 38 and thus provide a finely dispersed solid dispersion with the carrier material. The collecting electrode 32 may be formed by the base 15 of the casing 12, which might be formed from a metal, for example.

The hood 13 of the casing 12 may be made of hard tissue which has electrical insulating properties. The hard tissue hood 13 is equipped with a hole where the loaded gas can flow. Furthermore, there are two holes for the wire of the discharge electrode 28 for the first stage and for the field electrode 29 in the second stage. Both the discharge electrode 28 and the field electrode 29 are connected to a high voltage source (HPS 350 W, iseg Spezialelektronik GmbH, Radeberg, Germany).

In order to keep the molten material 38 in a molten state, a heater 42 is provided for heating the molten material 38 positioned in the receiving volume 36. With this regard, FIG. 1 shows that the heater 42 is positioned at a side of the collecting electrode 32 being opposite to the channel 22. This allows that the collecting electrode 32 is heated to keep the melt in a liquid state. Otherwise the sub-millimeter sized particles 40 would only collect on the surface of a solidified melt, which would not show the positive effects. In addition, the temperature is preferably adequately controlled to prevent destruction of the carrier material as molten material 38 and further to prevent melting of the sub-millimeter sized particles 40 in the melt. Sub-millimeter sized particle production can only start once the carrier matrix has liquefied and is present as molten material 38, or of the molten material 38 is provided in the receiving volume 36 in a molten state.

In a non-limiting detail, the electrostatic precipitator 10 contains a cartridge heater (160 W, Otom GmbH, Braunlingen, Germany) as heater 42 and a temperature sensor (EF7, Otom GmbH, Braunlingen, Germany). A controller (ETC 7420, ENDA, Istanbul, Turkey) ensures that the temperature of the melt can be kept constant. Generally, a temperature sensor 19 may be provided in order to realize a temperature control loop.

Not shown is a power supply which might be an AC power supply or a DC power supply for enabling the electrodes to provide an electric field.

A two-stage electrostatic precipitator like shown in FIG. 1 improves the dry separation of sub-millimeter sized particles 40 because of the absence of turbulence due to corona discharge. The separation and redispersion of already deposited particles 40 on a wet surface is more efficient than in a dry electrostatic precipitator. For this reason, the electrostatic precipitator 10 formed as melt electrostatic precipitator can also be designed as a single-stage system.

Figure 2:
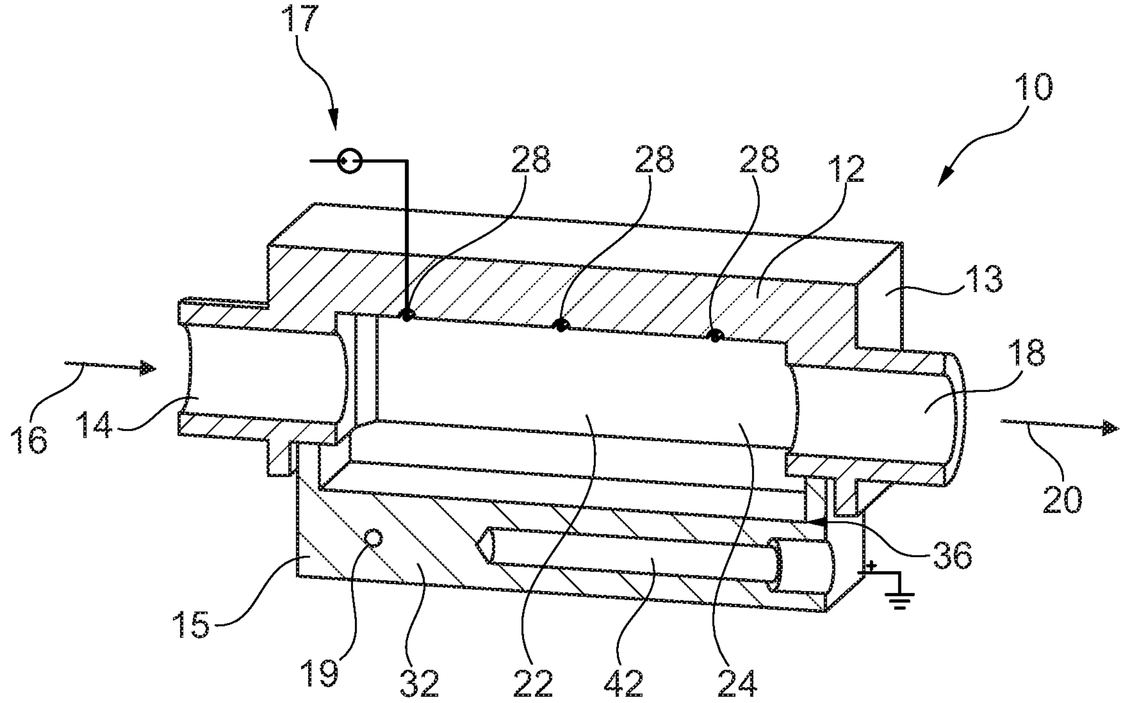
FIG. 2 shows an exemplary view of an electrostatic precipitator according to a further embodiment of the disclosure.

This is shown in FIG. 2. According to FIG. 2, a further embodiment of an electrostatic precipitator 10 is shown. With this regard, the electrostatic precipitator 10 according to FIG. 2 works with a comparable effect as described before with regard to FIG. 1. Therefore, mainly the differences between FIG. 1 and FIG. 2 are referred to, wherein the same reference numbers refer to the same or comparable elements. Further, all features as described with regard to FIG. 1 may be transferred to FIG. 2 unless not clearly excluded.

With regard to FIG. 2, the electrostatic precipitator 10 is a one-stage precipitator, wherein the one stage precipitator comprises a first chamber 24 which is adapted for applying an electrical field which acts on the sub-millimeter sized particles 40 being present in the gas stream and wherein the first chamber 24 is further adapted for collecting the sub-millimeter sized particles 40 at the collecting electrode 32, and wherein the first chamber 24 is further in fluid communication with the channel 22.

It is thus shown that the same electrical field is used for charging the particles 40 as well as for collecting the particles 40. The electrical field is built up, again, by the discharge electrode 28, and the collecting electrode 32, wherein the discharge electrode 28 is connected to a power supply 17 being designed as a DC power source or an AC power source and the collecting electrode 32 is connected to ground. Further, the discharge electrode 28 and the field electrode 34 as shown in FIG. 1 are combined to the discharge electrode 28 in FIG. 2. Correspondingly, the counter electrode 30 and the collecting electrode 32 as shown in FIG. 1 are combined to the collecting electrode 32 in FIG. 2.

According to this embodiment, an especially simple arrangement may be realized, as only two electrodes, i.e. the discharge electrode 28 and the collecting electrode 32, are required. Further, such an electrostatic precipitator 10 may be especially small so that an application even in limited building space is possible.

Figure 3:
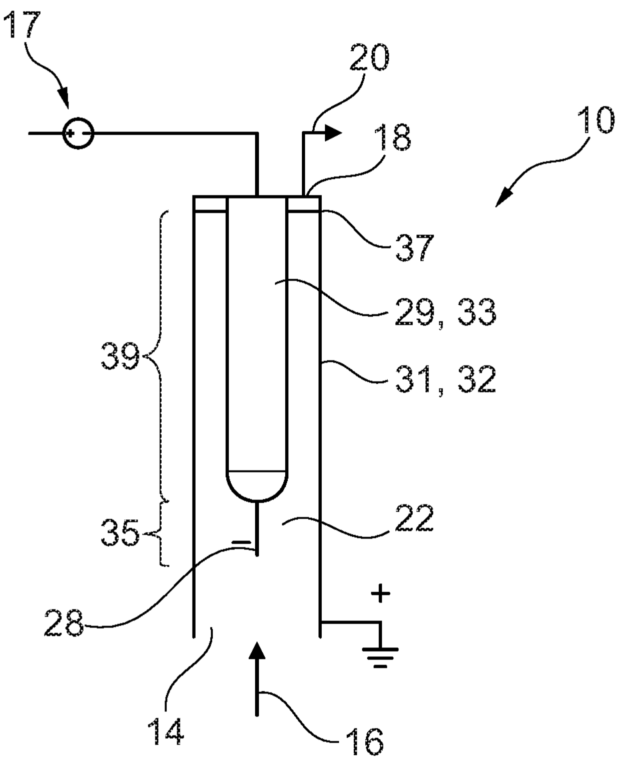
FIG. 3 shows an exemplary view of an electrostatic precipitator according to a further embodiment of the disclosure.

FIG. 3 shows a further embodiment of an electrostatic precipitator 10 according to the disclosure. Again, the same reference numbers refer to the same or comparable elements compared to FIGS. 1 and 2. Further, all features as described with regard to FIGS. 1 and 2 may be transferred to FIG. 2 unless not clearly excluded.

The embodiment of the electrostatic precipitator 10 according to FIG. 3 is arranged in a concentric arrangement, in which the discharge electrode 28 forms, together with an inner field electrode 29, the axis of the channel 22.

The outer pipe 31 is grounded and acts as a receiving electrode in the charging stage for ions and as a collecting 32 electrode for charged sub-millimeter sized particles 40 in the collection stage. The inner pipe 33 forms the field electrode, or discharge electrode 28, respectively, required to build up the electric potential like described above. A tungsten wire may be mounted to a hemisphere on the inner pipe 33 and may form the discharge electrode 28. That part forms a first stage 35, or charging state respectively, of the electrostatic precipitator 10. Downstream of the first stage 35, a second stage 39, or collecting stage, respectively, is provided at which the sub-millimeter sized particles 40 are collected in the molten material 38 as carrier material.

Both the inner pipe 33 and the outer pipe 31 may be made of stainless steel and may be electropolished to facilitate particle harvesting and cleaning. A sealing cap 37 at the outlet 18 may be made of polyvinyl chloride and acts as a seal that isolates the discharge from the outer collection electrode. The gas enters the precipitator 10 through inlet 14 and proceeds through the first stage 35 and the second stage 39 so that the gas stream is depleted with regard to the sub-millimeter sized particles 40 and the latter are collected in the molten material 38.

It has to be noted that a one-stage arrangement may be formed correspondingly as described above.

Further, it has to be noted that the receiving volume 36 is provided at the inner wall of the outer pipe 31, or collecting electrode 32, respectively. The molten material 38 may thus flow down at this inner wall and may be inserted into the channel 22 at the top and may leave the channel at the bottom of the channel 22 in case the precipitator 10 is arranged in a vertical arrangement like shown in FIG. 3. It may further be provided, that the precipitator 10 may work in a rotating manner, which gives more possible arrangements and a longer collection time of the molten material 38.

Figure 4:
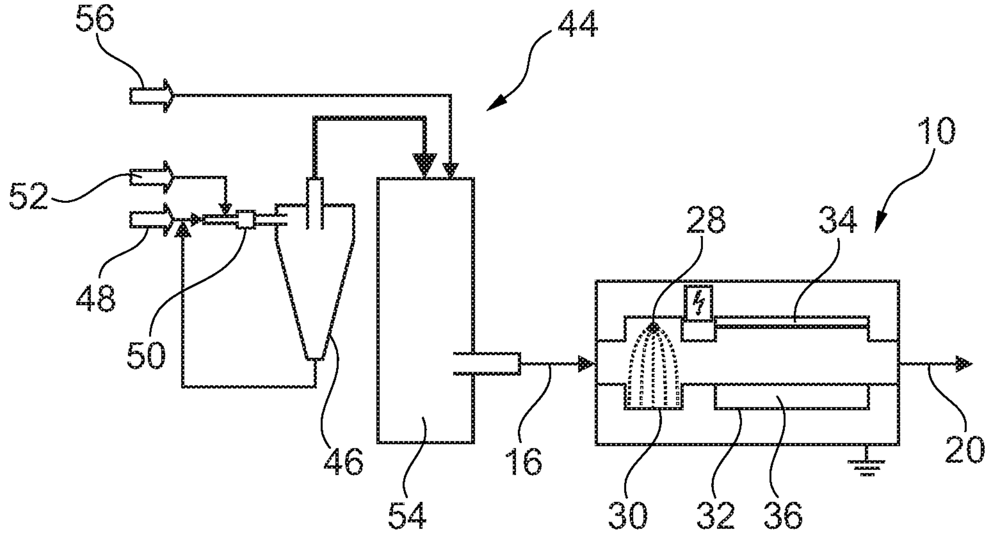
FIG. 4 shows an arrangement of an electrostatic precipitator according to an embodiment of the disclosure and a spray drying device.

FIG. 4 shows an electrostatic precipitator 10, wherein the electrostatic precipitator 10 is coupled to a device for producing sub-millimeter sized particles 40. In the non-limiting example of FIG. 2, the device is formed as a spray drying device 44.

The spray drying device 44 is designed, per an embodiment, for the production of active ingredient particles 40 in the sub-millimeter sized range, for example. For the production of sub-millimeter sized particles 40, solvent containing pharmaceutically active compound, for example, is sprayed into a cyclone as droplet separator 46 with a known cut off particle diameter like indicated by arrow 48 via a nozzle 50. Further, atomizing gas is guided into said nozzle 50 like indicated by the arrow 52 and is also inserted into the droplet separator 46. The aerosol conditioning is then separated in the cyclone, or the droplet separator 46, respectively and the smallest droplets enter a drying chamber 54. Further, a drying gas is added to the drying chamber 54, wherein the drying gas, such as drying air, is indicated by arrow 56.

With the help of spray drying, particles 40 in the sub-millimeter sized range are generated. These enter the electrostatic precipitator 10, are charged and move in an electric field towards the melt, after which the melt encloses the particles 40. The advantage of this process, per an embodiment, is the isolated presence of sub-millimeter sized particles 40 in a carrier matrix. Agglomerate formation can be avoided and the distribution of the active ingredient during administration shall be improved.

Figure 5:
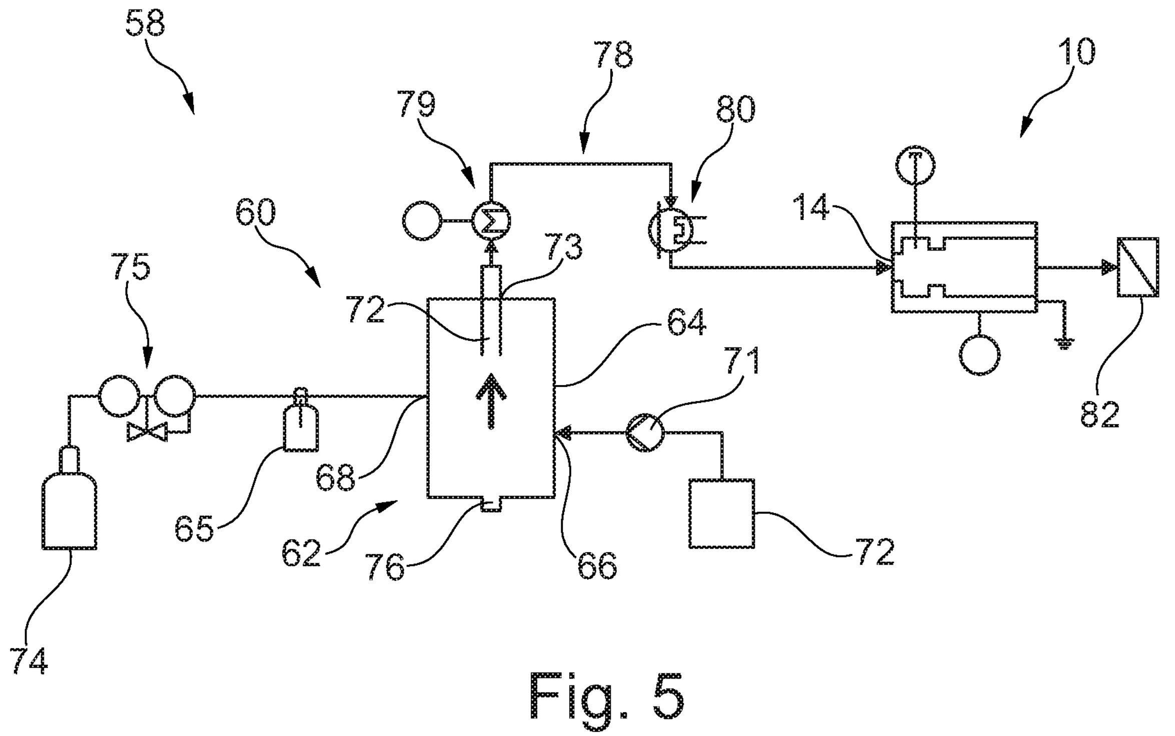
FIG. 5 shows an arrangement of an electrostatic precipitator and a system for forming sub-millimeter sized particles from a particle compound.

FIG. 5 shows an arrangement 58 of an electrostatic precipitator 10 and a system 60 for forming sub-millimeter sized particles from a particle compound. The electrostatic precipitator 10 and the system 60 for forming nanoparticles are arranged for guiding sub-millimeter sized particles from the system 60 for forming nanoparticles into the electrostatic precipitator 10 like described below.

The electrostatic precipitator 10 is arranged like described above and is not shown in detail.

The system 60 for forming sub-millimeter sized particles comprises an aerosol generator 62, the aerosol generator 62 comprising a nebulizing chamber 64 with a first inlet 66, a second inlet 68 and an outlet 70, which is formed as a tube 73. A tank 72 for receiving particle compound solution is connected to the first inlet 66 for introducing a solution of particle compound into the nebulizing chamber 64 by means of a pump 71, such as a gear pump, and wherein tank 74 for receiving carrier gas is connected to the second inlet 68 for introducing a carrier gas stream into the nebulizing chamber 64 such as by using a flow regulator 75. Both of the first inlet 66 and the second inlet 68 may be positioned in a tangential manner.

It is further shown that between flow regulator 75 and nebulizing chamber 64, a conditioning device 65 is provided. Such a conditioning device 65 may introduce a solvent into the carrier gas stream. By enriching, such as by saturating, the carrier gas with a solvent before the carrier gas enters the nebulizing chamber 64, it can be prevented that a precipitation of dry particles occurs in the nebulizing chamber 64, which may be attributed to a rapid droplet drying. In more detail, carbon dioxide as carrier gas may be taken from a pressurized cylinder as tank 74 was guided through a wash bottle filled with acetone to enrich the carbon dioxide with acetone before entering the nebulizing chamber 64.

Providing sub-millimeter sized particles to be present in the matrix in an isolated and thus non-agglomerated form.

Further provided in the nebulizing chamber 64 is a nebulizer 76 which is provided to form an aerosol out of the particle compound solution. The nebulizer 76 may comprise a piezo element which may emit ultrasonic waves in a frequency of e.g. 3 MHz, for example. The formed aerosol may be guided by the carrier gas stream out of the nebulizing chamber 64 through the outlet 70 and may further be guided to a dryer 78. By means of the dryer 78, such as comprising a heater 79, the solvent of the aerosol may be evaporated and preferably condensed in a condenser 80 of the dryer 78.

Downstream of the condenser 80, the dry particles may be guided by the solvent free carrier gas stream, which may be formed from carbon dioxide, into the inlet 14 of the electrostatic precipitator 10. Downstream of the electrostatic precipitator 10, a filter may be provided for collecting sub-millimeter sized particles 40 which are not guided into the carrier material.

EXAMPLES

When using the arrangement 58 according to FIG. 5, Particle shape and size of the particles, obtained with the aerosol generator 62, were investigated with a scanning electron microscope (SEM) (Hitachi H-S4500 FEG, Krefeld, Germany) at 1 kV with a magnification of up to 25,000. The load of phenytoin as particulate compound in xylitol as carrier material was determined via UV-Vis spectroscopy after dissolving in a mixture of isopropyl alcohol (Carl Roth GmbH & Co. KG, Karlsruhe, Germany) and demineralized water at a wavelength of 212 nm. An SEM picture shows small particles at the outlet of the aerosol generator in a size range 50-200 nm. The particles are shaped rectangular, which is a common observation in phenytoin crystals. The drug load of the melt increases with increasing time of precipitation until it reaches a limit of 1.76 wt. % after 15 minutes of loading, e.g. by an application of voltage of 7 kV a corona discharge at the discharge electrode.

The following example is further presented to provide those of ordinary skill in the art with a full and illustrative disclosure and description of how to make biologically active compositions by using an electrostatic precipitator 10 according to the disclosure as an exemplary embodiment.

In the context of this disclosure, an electrostatic precipitator 10 was used which was designed as a melt electrostatic precipitator (MESP). For this purpose, a pharmaceutically acceptable carrier is used as carrier substance which has a lower melting temperature than the deposited pharmaceutically active compound, but at the same time forms a solid at room temperature. The pharmaceutically acceptable carrier as carrier material is molten in the electrostatic precipitator 10 and subsequently loaded with sub-millimeter sized particles 40 of the pharmaceutically active compound by electrostatic precipitation. During powder recovery there is no redispersion in the air and inhalation during product handling is minimized.

Spray drying experiments were conducted with the drug naproxen (Tokyo Chemical Industry CO., LTD., Tokyo, Japan) dissolved in acetone (Merck KGaA, Darmstadt, Germany). According to BCS classification, naproxen is classified as a Class II active substance and is thus solubility limited in terms of its bioavailability. Naproxen was chosen mainly for its physical properties. The melting temperature is 152-158° C. and the solubility of naproxen in acetone is high, so that a concentration in the spray liquid up to 20 wt-% does not cause any difficulties. Xylitol (Xylisorb 300, Roquette Pharma, Lestrem, France) was selected as pharmaceutically acceptable carrier to match the deposited sub-millimeter sized particles 40. Xylitol has a melting temperature of 92-96° C., allowing it to be molten without dissolving the separated naproxen particles 40. Furthermore, xylitol has a high water solubility, which should facilitate the dissolution of the solid dispersion.

In order to prepare a solid dispersion of sub-millimeter sized particles 40 of naproxen in xylitol by usage of an electrostatic precipitator 10 according to an embodiment of the disclosure, the following procedure was used.

The active pharmaceutical naproxen was dissolved in acetone (5 wt-%) and then sprayed at 50° C. in a spray drying device. 44 To avoid explosive air mixtures, carbon dioxide is used for both spraying and drying. The prepared solution is sprayed with the help of a two-substance nozzle 50, which is operated with a HPLC pump (BlueShadow Pump 80P, KNAUER, Berlin, Germany) and a volume flow of 100 ml/min. Carbon dioxide is used as atomizing inert gas at a pressure of 3.5 bar and a mass flow of 3.7 kg/h. The aerosol was forced into a cyclone as droplet separator 46, where large droplets (larger than the cut off size diameter) are separated, small droplets (<3 μm) generate the conditioned aerosol and enter the drying section through the dip pipe.

Carbon dioxide is also supplied as drying gas via a drying gas distributor at an overpressure of 0.3 bar and a mass flow of 7.5 kg/h. Afterwards, the dried particles 40 are first charged in a two-stage electrostatic precipitator 10 and then separated into the molten xylitol in an electric field. The melting tank, or the receiving volume 36, respectively, of the electrostatic precipitator 10 is equipped with a pan such as made from aluminum to facilitate the removal of the product, which may be provided independent from the specific embodiment for performing batch processes. After the melt has cooled down, the solid dispersion can be further processed.

When using the electrostatic precipitator 10, a voltage of 4 kV may be applied by using a current of 5 mA, wherein generally, the voltage used should lie above the corona onset voltage. The electrodes used were formed from tungsten (discharge electrode 28) and V2A steel (collecting electrode 32 and base 15). The flow rate of the gas stream was set to be 5.5 m3/h. However, the before named parameters should be understood as being exemplary values only and can be varied in dependence of the specific application and the specific embodiment of the electrostatic precipitator 10.

The formed solid dispersion was characterized as follows. The solid dispersion produced was investigated to prove the functionality of the electrostatic precipitator 10. The particle size was measured with the Laser Diffraction Particle Sizer (Mastersizer 3000, Malvern Panalytical, Kassel, Germany) for wet dispersions. The solid dispersion was released using the USP Dissolution Apparatus 2 (DT 6, Erweka, Heusenstamm, Germany). The UV/Vis spectrometer (Lambda 25, PerkinElmer, Waltham, USA) was used to quantify the active substance content in the solution. Calibration and measurements with naproxen were performed at a wavelength of 230 nm.

The following could be observed.

The experiments were carried out by means of a spray drying test for a period of 2 hours. The aluminium pan containing the solidified melt was examined in a scanning electron microscope. A particle size of 100-300 nm was expected. Single particles with a diameter of approximately 200 nm were identified. No agglomerates could be found.

An improvement in water solubility can potentially lead to an increase in bioavailability. For this purpose, 1 g of the particle-loaden xylitol is weighed and dissolved in a release apparatus under the conditions of the United States Pharmacopeial Convention. USP <1092> The Dissolution Procedure. 2012.c. As a reference, the same amount of the commercially available active ingredient naproxen is dissolved under identical measuring conditions in order to investigate the effect on the dissolution.

Figure 6:
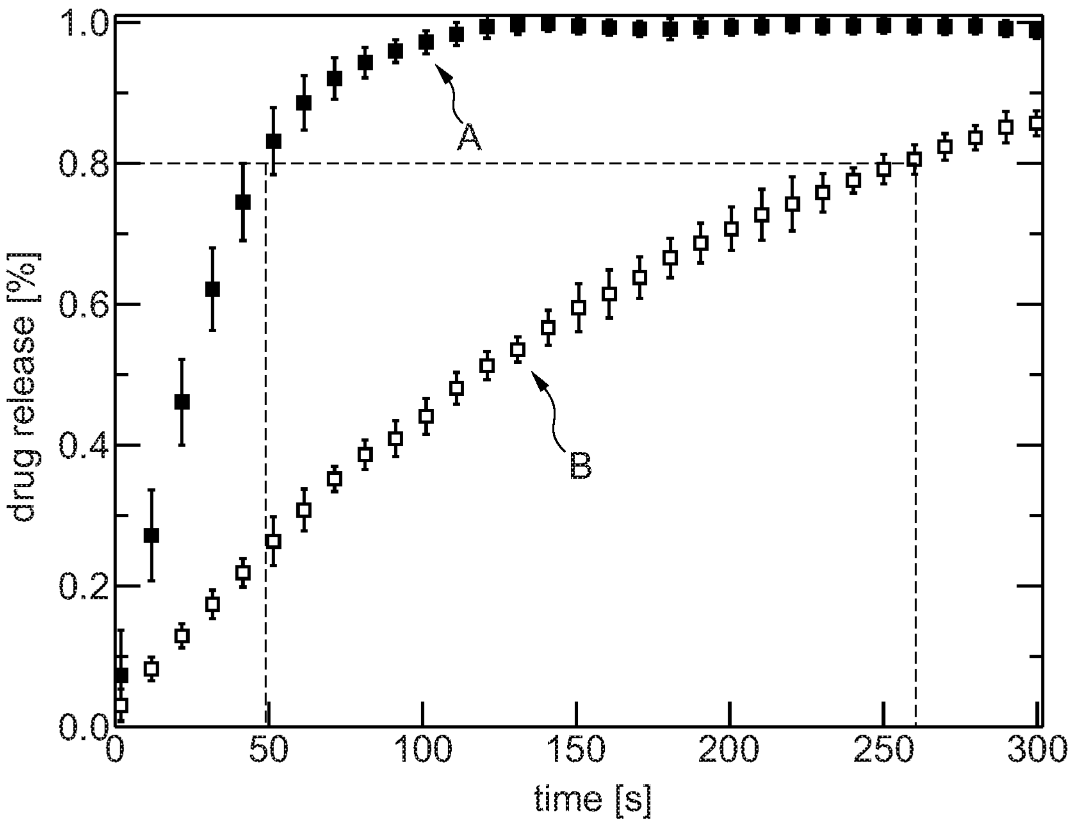
FIG. 6 shows the improved water-solubility of particles treated with an electrostatic precipitator according to an embodiment of the disclosure.

FIG. 6 shows the dissolution kinetics of the active pharmaceutical naproxen embedded in xylitol compared to unprocessed naproxen. In detail FIG. 6 shows a dissolution test in a UV/Vis spectrometer with sub-millimeter sized naproxen particles 40 in xylitol compared to unprocessed naproxen, wherein line A shows the sub-millimeter sized naproxen particles 40 in xylitol and line B shows unprocessed naproxen.

At first sight, the improvement in the dissolution rate can be recognized by the slope of the dissolution graph. After approximately 100 s, in the case of processed naproxen the entire dose is released. In comparison, the release of the unprocessed naproxen takes 300 s in this test. Thus, when using an electrostatic precipitator 10 according to an embodiment of the disclosure, a significant improvement in water solubility and thus in bioavailability could be observed.

Drug loads of the precipitated API in the xylitol melt were determined at different applied voltages. Voltages between the corona inception and the corona breakdown were chosen and experiments at a constant loading time were performed. With increasing applied voltage an increase of precipitated API was observed. At a loading time of 5 min drug loads of up to 0.25 wt. % could be obtained.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

10 electrostatic precipitator
12 casing
13 hood
14 inlet
15 base
16 arrow
17 power supply
18 outlet
19 temperature sensor
20 arrow
22 channel
24 first chamber
26 second chamber
28 discharge electrode
29 field electrode
30 counter electrode
31 outer pipe
32 collecting electrode
33 inner pipe
34 field electrode
35 first stage
36 receiving volume
37 sealing cap
38 molten material
39 second stage
40 sub-millimeter sized particles
42 heater
44 spray drying device
46 droplet separator
48 arrow
50 nozzle
52 arrow
54 drying chamber
56 arrow
58 arrangement
60 system

62 aerosol generator
64 nebulizing chamber
65 conditioning device
66 first inlet
68 second inlet
70 outlet
71 pump
72 tank
73 tube
74 tank
75 flow regulator
76 nebulizer
78 dryer
79 heater
80 condenser
82 filter

The invention claimed is:

1. Method for placing sub-millimeter sized particles in a carrier material, wherein the method comprises the following steps:

a.) providing an electrostatic precipitator comprising
  a casing having an inlet for inserting a gas flow into the casing and having an outlet for guiding the gas flow out of the casing,
  a channel for passing the gas flow from the inlet to the outlet between the inlet and the outlet,
  a discharge electrode on a first side of the channel and
  a collecting electrode at a second side of at least a part of the channel, the second side being located opposite to the first side such that the electrostatic precipitator is adapted for applying an electric field between the discharge electrode and the collecting electrode,
  a receiving volume adjacent to the collecting electrode and between the collecting electrode and at least a part of the channel;
b.) providing the carrier material in the receiving volume, wherein the carrier material is in the form of a molten material, and wherein the carrier material has a melting point which lies above 0° C.;
c.) guiding the sub-millimeter sized particles in the gas flow into the inlet and into the channel;
d.) applying the electric field between the discharge electrode and the collecting electrode such that the sub-millimeter sized particles are guided into the molten material; and
e.) removing the carrier material with embedded sub-millimeter sized particles from the receiving volume.

2. Method according to claim 1, wherein the carrier material has a melting point which is lower compared to a melting point of the sub-millimeter sized particles and which is lower compared to a degradation temperature of the sub-millimeter sized particles.

3. Method according to claim 1, wherein the sub-millimeter sized particles have a size in the range of ≥1 nm to ≤10 μm.

4. Method according to claim 1, wherein the temperature of the molten material in the receiving volume is controlled by a control loop.

5. Method according to claim 1, wherein the carrier material has a melting point at or higher than 22° C.

6. Method according to claim 5, wherein the carrier material has a melting point at or higher than 40° C.

7. Method according to claim 6, wherein the carrier material has a melting point at or higher than 50° C.

8. Method according to claim 7, wherein the carrier material has a melting point at or higher than 75° C.

* * * * *